United States Patent Office 3,476,817
Patented Nov. 4, 1969

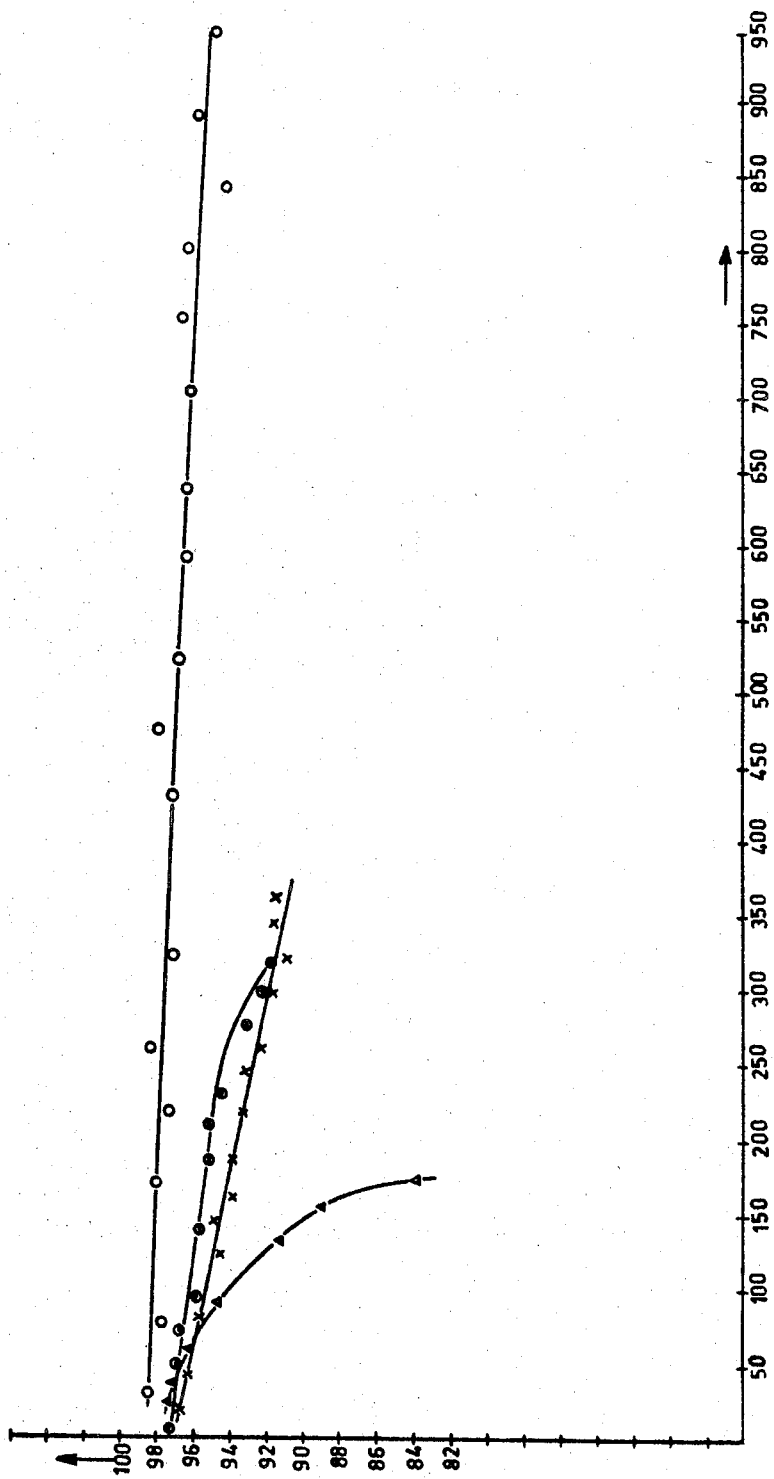

3,476,817
PROCESS FOR THE PREPARATION OF FLUORINATED ORGANIC COMPOUNDS VIA FLUORINATION IN VAPOR PHASE OF ALIPHATIC HYDROCARBONS
Martino Vecchio, Luciano Lodi, Vittorio Fattore, and Italo Cammarata, Milan, Italy, assignors to Montecatini Edison S.p.A., Milan, Italy
Filed Aug. 9, 1966, Ser. No. 571,218
Claims priority, application Italy, Sept. 14, 1965, 20,481/65
Int. Cl. C07c *17/10, 19/08, 19/04*
U.S. Cl. 260—653.7                7 Claims

ABSTRACT OF THE DISCLOSURE

A process for the production of chlorofluorinated aliphatic hydrocarbons, comprising passing a stream of an aliphatic hydrocarbon containing up to two carbon atoms, chlorine, hydrogen fluoride, oxygen, and at least one halogenated hydrocarbon recycled from the initial products of reaction, the said oxygen being present in molar quantities ranging from between 0.05 percent and 10 percent with respect to the moles of reactant aliphatic hydrocarbon, through a reaction zone over a chlorofluorination catalyst at a temperature of from 250° C. to 700° C., a pressure of from 1 to 15 atmospheres and for a contact time of from .1 to 30 seconds.

---

The present invention relates to an improved process for the production of fluorinated organic compounds, and, more particularly, it relates to a process for improving the life of catalysts used in chlorofluorination processes in vapor phase of aliphatic hydrocarbons.

It is known according to copending applications Ser. No. 536,596, filed Mar. 31, 1966, Ser. No. 329,361, filed Dec. 10, 1963, Ser. No. 329,402 filed Dec. 10, 1963, to prepare fluorinated organic compounds and, in particular, chlorofluorinated compounds, with high reaction speeds and high yields, by means of processes that include the reaction between a hydrocarbon, HF and $Cl_2$ in the presence of at least one halogenated hydrocarbon recycled from the mixture of products, in a quantity relatively great with respect to the molar quantity of the initial reactant hydrocarbon.

In such processes, solid catalysts are employed, some of which must be periodically re-activated, since, during the hereinbefore mentioned chlorofluorination reaction of saturated hydrocarbons, some carbon originating from the carbonization of organic compounds fouls the catalyst mass, gradually limiting catalytic activity.

In point of fact, catalytic activity is negatively influenced by carbon deposits of about 0.7% by weight with respect to the catalytic mass. The reactivation of the catalyst, which becomes necessary because of this phenomenon, gives rise to frequent interruptions of the reaction, with a corresponding waste of time which greatly detracts from the economic desirability of the process.

It has now been found that, according to this invention, it is possible to achieve a long life for the catalytic activity by conducting the reaction in the presence of oxygen or air, thus avoiding frequent reactivation of the catalyst.

It is, therefore, an object of this invention to provide a continuous improved process for the preparation of chlorofluorinated organic compounds, which evidences a substantial improvement over previously known processes.

Another object of this invention is that of providing a simple and economically convenient improved continuous process for the production of chlorofluorinated organic compounds, obtained via the chlorofluorination in vapor phase of aliphatic hydrocarbons.

A further object of this invention is that of providing an improved continuous process for the production of chlorofluorinated organic compounds, in which the catalyst maintains its catalystic activity over long periods of time without the necessity for frequent reactivation.

Still another object of this invention is that of providing a process for the production of chlorofluorinated hydrocarbons that permits the use of particularly active catalysts having good mechanical characteristics and abrasion resistance, as well as being inexpensive and readily available.

These objects are achieved by the process according to this invention, which process offers, furthermore, the advantage of reducing to a minimum production shut-downs due to the fact that it is possible to avoid frequent reactivation of the catalyst, thus diminishing the expense of the products obtained.

An additional advantage offered by the process according to this invention lies in the fact that a long catalyst life is achieved via the use of inexpensive and readily available substances.

These and other further objects that will be apparent to one skilled in the art from the following detailed description are achieved, according to the present invention, by a process for the production of organic compounds, particularly chlorofluorinated compounds, which process comprises mixing a non-halongenated aliphatic hydrocarbon having one or two carbon atoms with at least one halogenated hydrocarbon recycled from the mixture of products in quantities relatively great in comparison to the quantity of the initial reactant hydrocarbon and added oxygen or air, HF and $Cl_2$ and thence passing the mixture thus obtained over a fluorination catalyst either alone or together with a chlorination catalyst at a temperature comprised in the range from 250° C. to 700° C.

As a preferred embodiment of this invention, chlorofluorinated organic compounds are obtained in the following manner: A mixture comprising an aliphatic hydrocarbon having one or two atoms of C, HF, $Cl_2$, oxygen or air and at least one halogenated hydrocarbon recycled form the reaction mixture, in a quantity relatively large with respect to the quantity of the hydrocarbon to be chlorofluorinated, is continuously passed through a catalyst bed, for instance a fluid bed, which may be composed of oxides or salts, particularly of the fluorides or chlorides of Cr, Ni, Co, Al, Ga, V, Zr, Th, Zn, Fe, Pd, Cu, Bi, Pb and their mixtures, either alone or deposited on suitable supports such as, for example, alumina, fluorinated alumina, barium sulfate, at temperatures comprised in the range of from 250° C. to 700° C., and at pressures comprised in the range of from 1 to 15 absolute atmospheres, for contact times shorter than 30 seconds.

The oxygen, either pure or in the form of air, is fed in quantities comprised between 0.05% and 10% in moles with respect to the hydrocarbon to be fluorinated and is preferably comprised between 1% and 5%.

The temperature of the chlorofluorination reaction is comprised between 250° C. and 700° C. and preferably between 350° C. and 500° C.

The contact time may vary within very wide limits, although it must be borne in mind that the increase in this parameter leads to the formation of the more highly fluorinated compounds. In general, the process is conducted with contact times ranging from 0.1 to 30 seconds, and preferably from 1 to 10 seconds.

The aliphatic hydrocarbons with one or two carbon atoms, used as the starting material, may be selected from the group of compounds constituted of methane, acetylene, ethylene and ethane. They are fed into the reactor under molar ratios varying within a wide range, depending upon the type of product that one wishes to obtain.

A content of $O_2$ greater than the limit of 10% previously mentioned is readily tolerated, inasmuch as it does not disturb the course of the reaction. In such cases, however, technical difficulties deriving from an excess in $O_2$ arise in the separation and recovery phase of the products by distillation because the unreacted $O_2$ raises the vapor tension of the mixture of the reaction products to be distilled.

The recycled halogenated hydrocarbons, which not only serve as a thermal diluent but also, for reasons that have not as yet been fully clarified, as reaction promoters, by particularly increasing the reaction speed and by bringing the conversion rate and yields to surprisingly high levels, are present inside the reaction mixture in quantities of the order of 0.5 to 15 moles per mole of aliphatic hydrocarbon to be fluorinated.

These compounds may consist mainly of halogenated hydrocarbons having not more than two carbon atoms and containing at least one halogen atom selected from the group preferably consisting of chlorine and fluorine. These may be selected from the intermediates, products and by-products of the reaction. At any rate, in the recycle mixture there may be present halogenated hydrocarbons having more than 2 carbon atoms.

In order to further illustrate the present invention and the advantages thereof, the following specific examples are given, it being understood that these are merely intended to be illustrative and not limitative.

More particularly, in order to stress the importance of the presence of oxygen within the reaction mixture with respect to the longevity of catalytic activity, a test has been carried out and reported in Example 1 wherein the reaction is conducted in the absence of $O_2$.

The comparison between the results of said test and those of the tests carried out in the presence of $O_2$ clearly demonstrates how the $O_2$ in the reaction mixture will greatly increase the life of catalytic activity.

From the diagram hereto attached, a precise and immediate realization of the course of the reactions in the various tests will be evident.

In said diagram the duration in hours of the tests is marked on the abscissa, while the conversion percentage of HF is marked on the ordinate. The plotted curves of the diagram represent the graphs of the different tests at the different test conditions, and distinguished by the symbols:

○$O_2$=0.025 mol/mol $CH_4$
⊙$O_2$=0.050 mol/mol $CH_4$
×$O_2$=0.01 mol/mol $CH_4$
Δ$O_2$=absent

Example 1

Into a reactor containing 560 cc. of activated and fluorinated alumina maintained at a temperature of 470° C. at atmospheric pressure, a gaseous mixture was fed, which comprised chlorine, hydrofluoric acid, methane and a mixture of recycled halogenated hydrocarbons, in the following molar ratios:

| | Moles |
|---|---|
| Chlorine | 4 |
| HF | 1.6 |
| $CH_4$ | 1 |
| Recycled mixture | 3 |

The contact time of the gases inside the catalyst zone was 3 seconds, while the flow rate was 9.5 cm./sec. The gaseous mixture, upon leaving the reactor, was fed into a stripping column whose head was cooled by a mixture of trichloroethylene and $CO_2$. At the base of this stripping column there was gathered a mixture of products in liquid state, which was drawn off by means of a metering pump and was then recycled as the recycling mixture, while, from the head of the stripping column, a gaseous mixture was obtained forming the raw product of the reaction which, after washing, was analyzed.

The recycling mixture that was gathered at the base of the stripping column after about 210 hours of continuous operation displayed the following percent composition by weight:

| | Percent |
|---|---|
| $CCl_4$ | 77.70 |
| $CFCl_3$ | 14.59 |
| $CHCl_3$ | 4.49 |
| $CH_2Cl_2$ | 0.24 |
| High boiling prod. | 2.80 |

In Table 1 are recorded all the data relating to the reaction course:

TABLE 1

| Duration of test after— | Conversions in percent | | | Net yields with respect to the $CH_4$ in percent | | |
|---|---|---|---|---|---|---|
| | $Cl_2$ | HF | $CH_4$ | $CFCl_3$ | $CF_2Cl_2$ | $CF_3Cl$ |
| 25 hours | 94.9 | 97.2 | 98.2 | 51.3 | 46.9 | 0.5 |
| 38 hours | 95.9 | 96.8 | 98.3 | 49.8 | 48.6 | 0.3 |
| 60 hours | 96.5 | 96.2 | 98.3 | 52.7 | 45.1 | 0.3 |
| 84 hours | 97.3 | 94.7 | 98.2 | 56.2 | 42.1 | 0.3 |
| 130 hours | | 91.1 | 98.8 | 56.2 | 42.5 | 0.1 |
| 155 hours | 96.3 | 88.9 | 98.5 | 62.9 | 36.0 | 0.2 |
| 173 hours | 98.3 | 83.9 | 98.2 | 67.4 | 30.6 | 0.3 |

Example 2

Into the same equipment as was used in Example 1, and with the same operating procedures, a mixture was fed which was comprised of the hereunder listed compounds in the following molar ratios:

| | Moles |
|---|---|
| Chlorine | 4 |
| HF | 1.6 |
| $CH_4$ | 1.0 |
| $O_2$ | 0.01 |
| Recycling mixture | 3 |

The recycling mixture, tapped after 20 hours of running, displayed the following percent composition by weight:

| | Percent |
|---|---|
| $CCl_4$ | 72.70 |
| $CFCl_3$ | 18.06 |
| $CHCl_3$ | 4.80 |
| $CH_2Cl_2$ | 2.10 |
| High-boiling prod. | 1.60 |

In Table 2 are recorded the data relating to the course of this reaction.

TABLE 2

| Duration of test after— | Conversions in percent | | | Net yields with respect to the $CH_4$ in percent | | |
|---|---|---|---|---|---|---|
| | $Cl_2$ | HF | $CH_4$ | $CFCl_3$ | $CF_2Cl_2$ | $CF_3Cl$ |
| 20 hours | 96.0 | 96.8 | 99.1 | 41.6 | 56.4 | 0.5 |
| 42 hours | 95.4 | 96.3 | 98.4 | 46.3 | 51.5 | 0.4 |
| 80 hours | 95.8 | 95.5 | 98.8 | 49.9 | 47.9 | 0.3 |
| 125 hours | 95.8 | 94.4 | 98.4 | 41.4 | 56.2 | 0.1 |
| 142 hours | 96.4 | 94.6 | 99.0 | 57.5 | 41.2 | 0.3 |
| 162 hours | 96.4 | 93.6 | 99.5 | 58.9 | 39.6 | 0.3 |
| 188 hours | 96.5 | 93.6 | 99.4 | 59.1 | 39.5 | 0.3 |
| 218 hours | 94.8 | 93.1 | 99.4 | 59.5 | 39.0 | 0.3 |
| 248 hours | 94.8 | 93.0 | 99.4 | 61.3 | 37.6 | 0.2 |
| 262 hours | 96.1 | 92.2 | 99.7 | 63.2 | 35.6 | 0.1 |
| 300 hours | 97.1 | 91.5 | 98.7 | 59.9 | 38.4 | 0.3 |
| 324 hours | 96.6 | 90.6 | 99.1 | 59.9 | 38.7 | 0.2 |
| 345 hours | 96.7 | 91.4 | 99.0 | 45.9 | 52.0 | 0.4 |
| 360 hours | 94.5 | 91.4 | 99.7 | 64.1 | 34.6 | 0.3 |

Example 3

Into the same equipment as was used in Example 1, and with the same operating procedures a mixture was fed which was comprised of the hereunder listed compounds in the following molar ratios:

| | Moles |
|---|---|
| Chlorine | 4 |
| HF | 1.6 |
| $CH_4$ | 1.0 |
| $O_2$ | 0.025 |
| Recycling mixture | 3.0 |

The recycling mixture drawn after 20 hours of running displayed the following percent composition by weight:

| | Percent |
|---|---|
| $CCl_4$ | 72.60 |
| $CFCl_3$ | 23.20 |
| $CHCl_3$ | 1.50 |
| $CH_2Cl_2$ | 0.30 |
| High-boiling prod. | 2.40 |

In Table 3 are recorded the data relating to the course of the reaction.

TABLE 3

| Duration of test after— | Conversions in percent | | | Net yields with respect to the $CH_4$ in percent | | |
|---|---|---|---|---|---|---|
| | $Cl_2$ | HF | $CH_4$ | $CFCl_3$ | $CF_2Cl_2$ | $CF_3Cl$ |
| 30 hours | 96.7 | 98.3 | 98.8 | 34.2 | 63.7 | 1.8 |
| 78 hours | 98.3 | 97.7 | 98.6 | 36.0 | 62.0 | 1.6 |
| 172 hours | 95.4 | 98.0 | 100 | 36.8 | 62.0 | 1.0 |
| 220 hours | 98.5 | 97.2 | 100 | 36.2 | 62.9 | 0.9 |
| 268 hours | 96.2 | 98.3 | 100 | 37.9 | 61.0 | 0.9 |
| 433 hours | 94.2 | 97.0 | 100 | 33.5 | 65.6 | 0.9 |
| 476 hours | 93.2 | 97.9 | 99.5 | 30.7 | 68.2 | 1.1 |
| 549 hours | 93.4 | 96.7 | 100 | 32.0 | 67.1 | 0.9 |
| 597 hours | 94.4 | 96.3 | 100 | 35.6 | 63.6 | 0.8 |
| 710 hours | 92.0 | 96.0 | 99.2 | 33.3 | 65.1 | 0.9 |
| 758 hours | 93.4 | 96.7 | 100 | 34.6 | 64.3 | 0.8 |
| 804 hours | 93.7 | 96.3 | 100 | 35.9 | 63.1 | 0.8 |
| 846 hours | 95.6 | 94.3 | 100 | 37.0 | 62.0 | 0.9 |
| 883 hours | 95.2 | 96.0 | 100 | 37.8 | 61.6 | 0.6 |
| 957 hours | 93.8 | 94.7 | 100 | 40.6 | 58.6 | 0.8 |

Example 4

Into the same equipment as was used in Example 1, and with the same operating procedures, a mixture was fed which was comprised of the hereunder listed compounds, in the following molar ratios:

| | Moles |
|---|---|
| Chlorine | 4 |
| HF | 1.6 |
| $CH_4$ | 1.0 |
| $O_2$ | 0.05 |
| Recycling mixture | 3.0 |

The recycling mixture drawn after about 20 hours of running displayed the following percent composition by weight:

| | Percent |
|---|---|
| $CCl_4$ | 72.70 |
| $CFCl_3$ | 16.70 |
| $CHCl_3$ | 4.10 |
| $CH_2Cl_2$ | 0.26 |
| High-boiling prod. | 6.20 |

In Table 4 are recorded the data relating to the course of the reaction:

TABLE 4

| Duration of test after— | Conversions in percent | | | Net yields with respect to the $CH_4$ in percent | | |
|---|---|---|---|---|---|---|
| | $Cl_2$ | HF | $CH_4$ | $CFCl_3$ | $CF_2Cl_2$ | $CF_3Cl$ |
| 2 hours | 95.3 | 97.3 | 97.5 | 42.0 | 54.4 | 0.6 |
| 26 hours | 95.4 | 97.8 | 98.1 | 41.1 | 54.4 | 0.5 |
| 50 hours | 96.0 | 96.8 | 98.1 | 41.6 | 56.1 | 0.8 |
| 74 hours | 95.7 | 96.7 | 98.9 | 38.9 | 58.7 | 0.5 |
| 100 hours | 95.1 | 95.8 | 98.4 | 39.2 | 58.1 | 0.6 |
| 120 hours | 94.8 | 96.8 | 99.0 | 43.2 | 53.9 | 0.7 |
| 144 hours | 94.8 | 95.5 | 99.7 | 47.3 | 50.7 | 0.4 |
| 168 hours | 95.3 | 94.9 | 99.1 | 44.3 | 53.5 | 0.6 |
| 188 hours | 95.4 | 95.1 | 98.3 | 41.0 | 56.4 | 0.4 |
| 210 hours | 95.0 | 95.0 | 97.3 | 45.8 | 51.8 | 0.7 |
| 234 hours | 94.9 | 94.3 | 99.0 | 44.3 | 53.5 | 0.8 |
| 258 hours | 95.2 | 94.9 | 99.0 | 42.9 | 53.4 | 0.7 |
| 290 hours | 95.6 | 93.0 | 99.7 | 50.5 | 47.4 | 0.5 |
| 322 hours | 95.6 | 91.9 | 98.8 | 47.2 | 50.6 | 0.5 |
| 356 hours | 95.5 | 91.7 | 99.0 | 52.8 | 44.5 | 0.7 |

Example 5

Into the same equipment as was used in Example 1, a mixture was fed which was comprised of the hereunder listed compounds in the following molar ratios:

| | Moles |
|---|---|
| Chlorine | 4 |
| HF | 1.6 |
| $CH_4$ | 1 |
| $O_2$ | 0.01 |
| Recycling mixture | 3 |

The recycling mixture drawn after 65 hours of running displayed the following percent composition by weight:

| | Percent |
|---|---|
| $CCl_2F_2$ | 0.14 |
| $CHCl_2F$ | 0.01 |
| $CCl_3F$ | 36.00 |
| $CH_2Cl_2$ | 0.02 |
| $CHCl_3$ | 0.70 |
| $CCl_4$ | 60.80 |
| High-boiling prod. | 2.40 |

The test was carried out at a reaction temperature of 435° C. and at a contact time of 6 seconds. In Table 5 are recorded the data relating to the course of the reaction:

TABLE 5

| Duration of test after— | Conversions in percent | | | Net yields with respect to the $CH_4$ in percent | | |
|---|---|---|---|---|---|---|
| | $Cl_2$ | HF | $CH_4$ | $CFCl_3$ | $CF_2Cl_2$ | $CF_3Cl$ |
| 23 hours | 94.0 | 96.5 | 99.8 | 47.6 | 52.1 | 0.2 |
| 47 hours | 94.5 | 95.6 | 99.8 | 56.8 | 41.0 | 0.1 |
| 87 hours | 93.7 | 95.3 | 99.8 | 54.5 | 45.1 | 0.1 |
| 159 hours | 96.3 | 96.0 | 99.5 | 58.7 | 40.6 | 0.1 |
| 199 hours | 97.8 | 95.3 | 99.1 | 52.5 | 47.0 | 0.1 |
| 242 hours | 96.4 | 94.8 | 99.5 | 52.0 | 47.2 | 0.1 |
| 267 hours | 96.7 | 93.5 | 99.5 | 54.0 | 44.9 | 0.1 |
| 316 hours | 95.7 | 92.8 | 99.8 | 53.8 | 45.5 | 0.1 |
| 362 hours | 95.5 | 92.9 | 99.7 | 56.3 | 43.0 | 0.1 |
| 399 hours | 94.9 | 93.1 | 99.7 | 57.7 | 41.6 | 0.0 |
| 444 hours | 96.4 | 93.6 | 99.5 | 57.3 | 41.9 | 0.0 |
| 553 hours | 96.3 | 92.0 | 99.5 | 63.3 | 36.1 | 0.0 |
| 599 hours | 94.5 | 95.2 | 99.8 | | | |
| 637 hours | 98.3 | 91.0 | 99.8 | 61.5 | 38.0 | 0.0 |
| 683 hours | 95.6 | 90.5 | 99.5 | 63.4 | 35.7 | 0.1 |

What is claimed is:

1. A process for the production of chlorofluorinated aliphatic hydrocarbons, comprising passing a stream of an aliphatic hydrocarbon containing up to two carbon atoms, chlorine, hydrogen fluoride, oxygen, and at least one halogenated hydrocarbon recycled from the initial products of reaction, the said oxygen being present in molar quantities ranging from between 0.05 percent and 10 percent with respect to the moles of reactant aliphatic hydrocarbon, through a reaction zone over a chlorofluorination catalyst which is fluorinated alumina at a temperature of from 250° C. to 700° C., a pressure of from 1 to 15 atmospheres and for a contact time of from .1 to 30 seconds.

2. The process as defined by claim 1, wherein the reactant aliphatic hydrocarbon is methane.

3. The process as defined by claim 2, wherein the oxygen is present in molar quantities ranging from between 1 percent and 5 percent with respect to the moles of methane.

4. The process as defined by claim 3, wherein the reaction temperature ranges from between 350° C. and 500° C.

5. The process as defined by claim 4, wherein the molar ratio between the chlorine and the methane is about 4.

6. The process as defined by claim 4, wherein the recycle is present in an amount ranging from between 0.5 and 15 moles per mole of methane.

7. The process as defined by claim 6, wherein the contact time ranges from between 1 and 10 seconds.

References Cited

UNITED STATES PATENTS

| | | | |
|---|---|---|---|
| 2,458,551 | 1/1949 | Benning et al. | 260—653.7 |
| 2,946,827 | 7/1960 | Belf | 260—653.7 |
| 3,294,852 | 12/1966 | Vecchio et al. | 260—653.7 |
| 3,308,174 | 3/1967 | Edwards et al. | 260—653.5 |

FOREIGN PATENTS

| | | |
|---|---|---|
| 546,962 | 10/1957 | Canada. |
| 714,103 | 7/1965 | Canada. |

DANIEL D. HORWITZ, Primary Examiner